F. Milliken.
Steam Cooking App's.

Nº 38,238.　　　　　　　　Patented Apr. 21, 1863.

Witnesses
Norman W. Stearns
P. E. Teschemacher

Inventor
Francis Milliken

UNITED STATES PATENT OFFICE.

FRANCIS MILLIKEN, OF BOSTON, MASSACHUSETTS.

IMPROVEMENT IN STEAM COOKING APPARATUS.

Specification forming part of Letters Patent No. 38,238, dated April 21, 1863.

*To all whom it may concern:*

Be it known that I, FRANCIS MILLIKEN, of Boston, in the county of Suffolk and State of Massachusetts, have invented an Improved Apparatus for Cooking by Steam, of which the following is a full, clear, and exact description, reference being had to the accompanying drawings, making part of this specification, in which—

Figure 4:
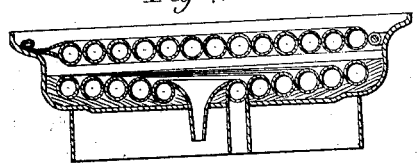
Figure 1:
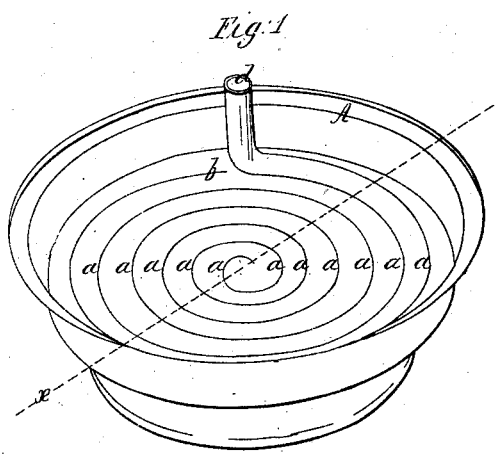
Figure 3:
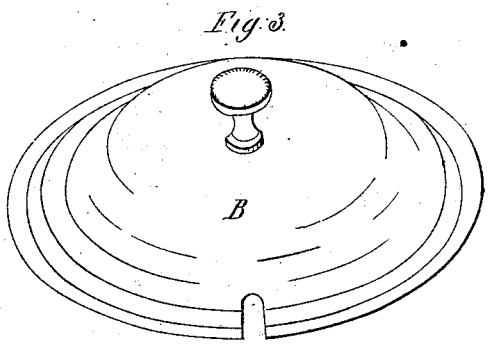
Figure 2:
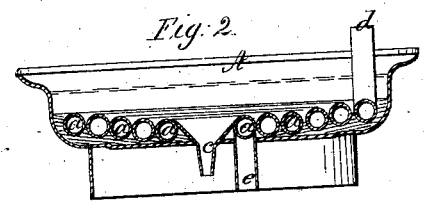

Figure 1 is a perspective view of my improved apparatus; Fig. 2, a section on line $x\ x$ of Fig. 1; Fig. 3, a view of the cover detached; Fig. 4, a modification, to which reference will be made hereinafter.

The object of my invention is to produce an apparatus to enable me to fry and broil by the agency of steam.

I am aware that steam has been used for baking and boiling; but my improvement consists in a metallic dish containing a coiled hollow tube of tinned brass or other suitable metal, through which the steam circulates, the meat or other article to be fried being placed on top and in immediate contact with it.

To enable others skilled in the art to make and use my invention, I will proceed to describe the manner in which I have carried it out.

In the said drawings, A represents a circular metallic dish, within which is arranged, in the form of a coil, the hollow tube $a$, of tinned brass or other suitable metal, kept in juxtaposition by soldering throughout its entire length, the line of the points of contact of the coil forming a regular incline from its periphery $b$ to the circular cavity in the center of the dish, where it terminates in a vertical opening or tunnel, $c$, which passes through the bottom. One extremity, $d$, of this hollow tube leads upward or outward from the dish, while the other end, $e$, passes out underneath. A current of steam passes continually through the tube $a$, entering at the end $d$ and passing out at the end $e$ into a receptacle, where it may be used for various culinary purposes, such as boiling water, &c. B is a cover, which fits tightly on top of the dish A, the end of the tube $a$ passing through it. A similar arrangement of coils can be employed for the purpose of heating dishes or keeping hot articles of food already cooked.

Operation: The meat or food to be fried or broiled is placed on the coiled tube $a$ within the dish A. The cover B is then placed on, the steam passing through the tube, as before explained. After one side is sufficiently cooked it is turned over and the other side goes through the frying process. The gravy or juice of the meat drops into the inclined groove formed by the contact of the folds of the tube, and finds its way to the cavity in the center of the utensil, and through the funnel-shaped opening into a dish placed there to receive it.

Instead of the arrangement above described, the steam may be made to pass between two metallic plates riveted together, the meat being placed on the upper plate.

Another modification of my apparatus, which I sometimes propose to use, is seen in Fig. 4, in which the article to be cooked is placed between two separate coils of tube hinged together, thus enabling me to cook both sides simultaneously. The method first described is, however, that which I prefer, being less expensive and more simple.

What I claim as my invention, and desire to secure by Letters Patent, is—

The within-described apparatus for frying and broiling by means of steam, arranged and operating in the manner substantially as set forth.

FRANCIS MILLIKEN.

Witnesses:
 NORMAN W. STEARNS,
 P. E. TESCHEMACHER.